April 5, 1927.
E. A. NELSON
1,623,262
BRAKE OPERATING MEANS
Filed Sept. 23, 1925
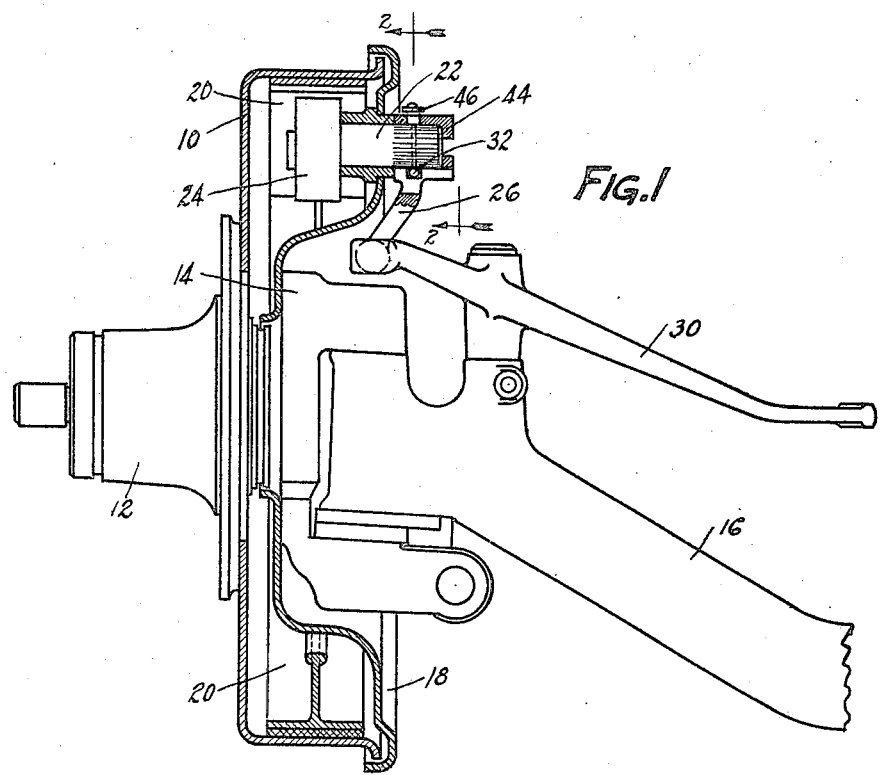
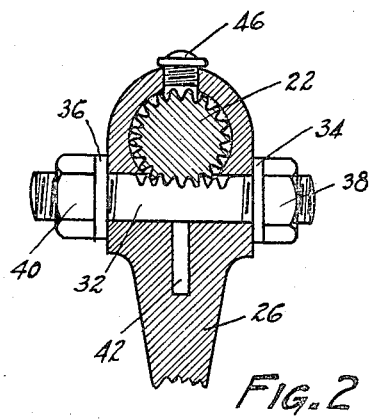
INVENTOR
EMIL A. NELSON
BY
Jn. W. McConkey
ATTORNEY Patented Apr. 5, 1927.

1,623,262

UNITED STATES PATENT OFFICE.

EMIL A. NELSON, OF DETROIT, MICHIGAN, ASSIGNOR TO BENDIX BRAKE COMPANY, OF CHICAGO, ILLINOIS, A CORPORATION OF ILLINOIS.

BRAKE-OPERATING MEANS.

Application filed September 23, 1925. Serial No. 58,069.

This invention relates to brakes, and is illustrated as embodied in operating mechanism for a front wheel automobile brake.

An object of the invention is to provide a positive, simple, and easily-accessible adjustment for the brake, preferably operated by manipulation of a clamp which holds the operating crank or arm on the brake-applying shaft, so that no extra parts are required and no additional cost is involved.

In one desirable arrangement, the adjusting member is carried by the hub of the operating arm, and is formed with teeth meshing with teeth on the shaft, so that it can be manipulated directly to turn the arm on the shaft. In the embodiment illustrated, the adjusting member is a longitudinally-movable rack meshing with pinion teeth on the shaft. By loosening up a clamping nut on one end of the rack, and then tightening the nut on the other end, a positive adjustment is very easily made, and the parts are at the same time clamped tightly together.

The above-described adjustment is of especial utility where the operating arm swivels with the wheel, and is moved by a lever or the like in such a manner that the joint between the arm and lever moves horizontally from an idle position spaced from the swivelling axis of the wheel to an active position substantially in that axis.

The above and other objects and features of the invention, including novel means for lubricating the adjustment, and other novel arrangements and desirable particular constructions, will be apparent from the following description of one illustrative embodiment shown in the accompanying drawings, in which:

Fig. 1 is a vertical section through one front brake and associated parts, showing the control levers in rear elevation; and Fig. 2 is a vertical section on the line 2—2 of Fig. 1, showing the crank lever adjustment.

In the arrangement selected for illustration, the brake includes a drum 10 rotating with a wheel, the hub of which is shown at 12, and which is rotatably mounted on the spindle of a front wheel knuckle 14. Knuckle 14 is swivelled by the usual kingpin at the end of a front axle 16, and carries a stationary support such as a backing plate 18, on which the brake shoes 20 or their equivalent are anchored.

A short shaft 22 carried by support 18 operates the brake-applying means shown as a double cam 24 between the ends of the brake shoes, and is serrated at its inner end to have clamped thereon a crank arm or lever 26, the serrations in effect forming gear or pinion teeth, thus forming an integral adjusting pinion on the shaft 22.

Crank arm 26 is formed with a ball end engaged by a vertical plane surface on the end of a generally horizontally-swinging lever 30 fulcrumed between its ends on axle 16, and connected in any suitable manner to the brake-operating mechanism at its inner end. This forms in effect a universal joint between levers 26 and 30, which joint moves in applying the brake from an idle position spaced rearwardly of the swivelling axis forwardly to an active position substantially in that axis, or a fraction of an inch outside that axis if the outer brake is to be relieved on a turn.

The teeth or serrations on the end of shaft 22 mesh with rack teeth formed on a slide or clamping rack 32 arranged in a cross opening or recess in the hub of arm 26, and which is cylindrical and threaded, at least at its ends, to receive washers 34 and 36 and nuts 38 and 40. Rack 32 may be square in cross-section or otherwise formed to prevent turning. Arm 26 is slotted at 42 to increase the resilience of its hub, to permit it to contract on shaft 22 when nuts 38 and 40 are tightened. It also has a flange 44 on its end overlying the ends of the pinion teeth, to retain lubricant, and may carry a lubricant fitting 46.

By this arrangement, the position of the end of lever or crank 26 with respect to the swivelling axis of the wheel may be adjusted by loosening one of the nuts 38 or 40 the required number of turns, and then tightening up on the other, simultaneously adjusting the crank angularly on the shaft and contracting its hub to clamp it on the shaft.

While one illustrative embodiment has been described in detail, it is not my intention to limit the scope of the invention to that particular embodiment, or otherwise than by the terms of the appended claims.

I claim:

1. Operating mechanism comprising, in combination, a shaft, an arm having a slotted hub encircling the shaft, a member carried by said hub and engaging the shaft and movable lengthwise in the hub to turn the arm on the shaft, and means engaging said member and operable to contract the split hub on the shaft.

2. Operating mechanism comprising, in combination, a shaft, an arm having a hub encircling the shaft, a member carried by said hub and engaging the shaft and movable lengthwise in the hub to turn the arm on the shaft, and means engaging said member and operable to clamp the arm on the shaft.

3. Operating mechanism comprising, in combination, a shaft, an arm mounted on the shaft, an adjusting member non-rotatably carried by the arm and engaging the shaft and movable lengthwise in a manner to turn the arm on the shaft, and nuts threaded on said member to be tightened against the arm.

4. Operating mechanism comprising, in combination, a shaft, an arm mounted on the shaft, and an adjusting member non-rotatably carried by the arm and engaging the shaft and movable lengthwise in a manner to turn the arm on the shaft.

5. Brake-operating mechanism comprising, in combination, a brake-applying shaft having pinion teeth, an operating arm having a hub sleeved on the shaft, a slidable and non-rotatable rack movable lengthwise in a recess formed in said hub and meshing with said pinion teeth, and means for holding the rack from lengthwise movement to preserve the adjustments of the arm on the shaft.

6. Brake-operating mechanism comprising, in combination, a brake-applying shaft having pinion teeth, an operating arm having a hub sleeved on the shaft, a slidable and non-rotatable rack movable lengthwise in a recess formed in said hub and meshing with said pinion teeth, and a nut threaded on each end of the rack and adapted to be tightened against the corresponding side of the arm.

7. Brake-operating mechanism comprising, in combination, a brake-applying shaft having pinion teeth, an operating arm having a hub sleeved on the shaft, a rack movable lengthwise in a recess formed in said hub and meshing with said pinion teeth, and a nut threaded on each end of the rack and adapted to be tightened against the corresponding side of the arm, the hub being slotted to permit said nuts to contract it on the shaft.

8. Brake-operating mechanism comprising, in combination, a brake-applying shaft having pinion teeth, an operating arm having a hub sleeved on the shaft, the hub having a squared cross opening, a rack movable lengthwise in said opening and meshing with said pinion teeth, and means for locking the arm and rack and shaft together.

9. Operating mechanism comprising, in combination, a shaft having integral pinion teeth at one end, an operating arm having a slotted hub embracing the part of the shaft formed with teeth, the hub having a cross opening, a rack in the opening meshing with said pinion teeth, and nuts on the opposite ends of the rack adapted to be tightened against the opposite sides of the arm to contract said hub to clamp it on the shaft.

10. Operating mechanism comprising, in combination, a shaft having integral pinion teeth at one end, an operating arm having a hub embracing the part of the shaft formed with teeth, the hub having a cross opening, a slidable and non-rotatable rack in the opening meshing with said pinion teeth, and nuts on the opposite ends of the rack adapted to be tightened against the opposite sides of the arm.

11. Operating mechanism comprising, in combination, a shaft having integral pinion teeth at one end, an operating arm having a hub embracing the part of the shaft formed with teeth and having an end flange covering the ends of the teeth, the hub having a cross opening, a rack in the opening meshing with said pinion teeth, and nuts on the opposite ends of the rack adapted to be tightened against the opposite sides of the arm.

12. Operating mechanism comprising, in combination, a shaft having integral pinion teeth at one end, an operating arm having a hub embracing the part of the shaft formed with teeth and having an end flange covering the ends of the teeth, the hub having a cross opening, a rack in the opening meshing with said pinion teeth, and nuts on the opposite ends of the rack adapted to be tightened against the opposite sides of the arm, together with means for introducing lubricant into said hub.

13. Operating mechanism comprising, in combination, a shaft having gear teeth at one end, an arm having a hub encircling the gear teeth, the hub being formed with a cross opening on the side next the arm and provided with a slot extending into the arm, an adjusting member in said opening having teeth meshing with the teeth of the shaft and movable lengthwise to turn the arm angularly on the shaft, and clamping means engaging said member and locking the arm on the shaft in adjusted angular position by contracting said hub.

14. Operating mechanism comprising, in combination, a shaft having gear teeth at one end, an arm having a hub encircling the gear teeth, the hub being formed with a cross opening on the side next the arm, an adjusting member in said opening having teeth meshing with the teeth of the shaft and movable lengthwise to turn the arm angularly on the shaft, and clamping means engaging said member and locking the arm on the shaft in adjusted angular position.

In testimony whereof I have hereunto signed my name.

EMIL A. NELSON.